(12) United States Patent
Uttaro

(10) Patent No.: US 10,000,016 B2
(45) Date of Patent: *Jun. 19, 2018

(54) FILM EDGE SEALING DEVICE

(71) Applicant: Extreme Packaging Machinery, Inc., Rancho Santa Margarita, CA (US)

(72) Inventor: Raymond Uttaro, San Juan Capistrano, CA (US)

(73) Assignee: EXTREME PACKAGING MACHINERY, INC., Rancho Santa, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/294,450

(22) Filed: Oct. 14, 2016

(65) Prior Publication Data

US 2017/0043527 A1 Feb. 16, 2017

Related U.S. Application Data

(63) Continuation of application No. 14/827,145, filed on Aug. 14, 2015, now Pat. No. 9,499,289.

(51) Int. Cl.
*B32B 37/00* (2006.01)
*B29C 65/20* (2006.01)
(Continued)

(52) U.S. Cl.
CPC ............. *B29C 65/20* (2013.01); *B29C 65/18* (2013.01); *B29C 65/305* (2013.01); *B29C 65/787* (2013.01); *B29C 65/7873* (2013.01); *B29C 66/137* (2013.01); *B29C 66/43* (2013.01); *B29C 66/431* (2013.01); *B29C 66/4322* (2013.01); *B29C 66/43121* (2013.01); *B29C 66/73921* (2013.01); *B29C 66/8167* (2013.01); *B29C 66/81431* (2013.01); *B29C 66/8223* (2013.01);
(Continued)

(58) Field of Classification Search
CPC ...... B65B 51/306; B65D 65/38; B65D 75/20; B29C 65/18; B29C 65/20; B29C 65/305; B29C 65/787; B29C 65/7873; B29C 66/137; B29C 66/43; B29C 66/431; B29C 66/43121; B29C 66/4322
USPC .......................... 156/555, 582, 583.1, 583.5
See application file for complete search history.

(56) References Cited

U.S. PATENT DOCUMENTS

| | | |
|---|---|---|
| 3,015,600 A | 1/1962 | Cook |
| 4,238,263 A | 12/1980 | Lomaglio |
| 5,149,393 A | 9/1992 | Hutchinson |
| 6,526,728 B1 | 3/2003 | Sorenson |
| 7,637,299 B2 * | 12/2009 | King, Jr. .............. B26D 1/0006 156/251 |
| 8,651,162 B2 * | 2/2014 | Christman .............. B29C 65/18 156/553 |

(Continued)

OTHER PUBLICATIONS

Texwrap 2202,youtube.com, Published Aug. 5, 2015, https://www.youtube.com/watch?v=iT7gomjdEKY&feature=player_detailpage.

(Continued)

*Primary Examiner* — James Sells
(74) *Attorney, Agent, or Firm* — Stetina Brunda Garred and Brucker

(57) ABSTRACT

A film edge sealing device is disclosed herein which has a groove defining a base. The base of the groove of the edge sealing device is oriented at a skewed angle with respect to a longitudinal direction of the conveyor of the heat sealing machine. Edges of a thermoplastic sheet or two stacked layers of thermoplastic sheets are introduced into the groove of the edge sealing device and placed in contact therewith to both heat and melt the edges of the thermoplastic sheet(s) to form a bead and join the edges thereof to form an edge bead seal.

22 Claims, 13 Drawing Sheets

(51) Int. Cl.
*B65B 51/30* (2006.01)
*B29C 65/18* (2006.01)
*B29C 65/30* (2006.01)
*B29C 65/78* (2006.01)
*B29C 65/00* (2006.01)
*B65B 51/10* (2006.01)
*B29K 701/12* (2006.01)

(52) U.S. Cl.
CPC ...... *B29C 66/836* (2013.01); *B29C 66/83411* (2013.01); *B29C 66/849* (2013.01); *B29C 66/84123* (2013.01); *B29C 66/9161* (2013.01); *B29C 66/91212* (2013.01); *B29C 66/91231* (2013.01); *B29C 66/91431* (2013.01); *B29C 66/961* (2013.01); *B65B 51/10* (2013.01); *B65B 51/306* (2013.01); *B29C 66/7352* (2013.01); *B29C 66/81423* (2013.01); *B29C 66/919* (2013.01); *B29C 66/91933* (2013.01); *B29C 66/934* (2013.01); *B29K 2701/12* (2013.01)

(56) References Cited

U.S. PATENT DOCUMENTS

| | | | |
|---|---|---|---|
| 8,820,035 B2* | 9/2014 | Christman | B29C 65/18 53/375.9 |
| 9,499,289 B1 | 11/2016 | Uttaro | |
| 2006/0107622 A1 | 5/2006 | James | |
| 2007/0080078 A1 | 4/2007 | Hansen | |

OTHER PUBLICATIONS

Screenshot of Texwrap 2202, youtube.com, Published Aug. 5, 2015, https://www.youtube.com/watch?v=iT7gomjdEKY&feature=player_detailpage.

Shane Thomas, PCT Notification of Transmittal of the International Search Report and the Written Opinion of the International Searching Authority, or the Declaration, dated Jan. 13, 2017, pp. 1-11.

* cited by examiner

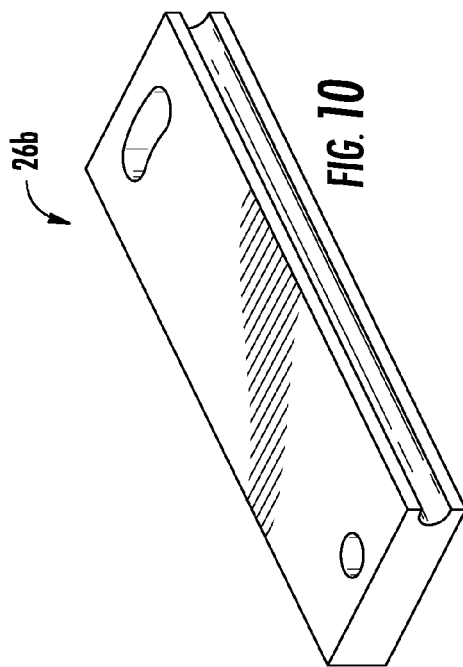
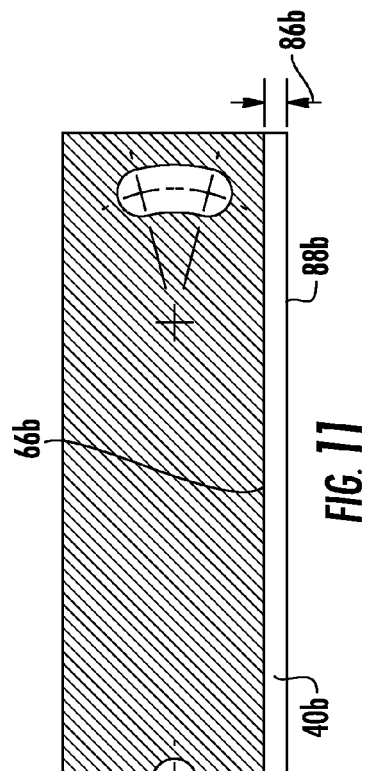
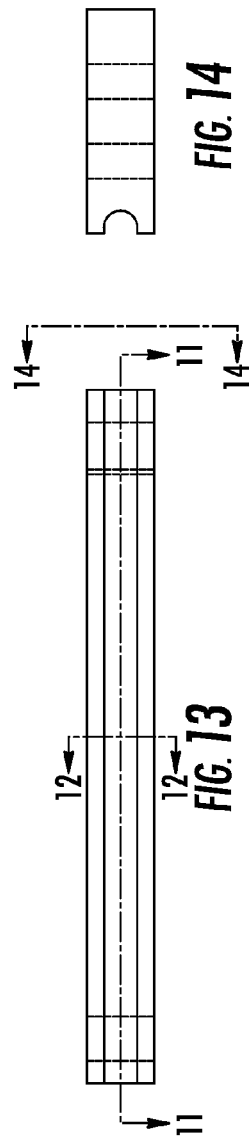
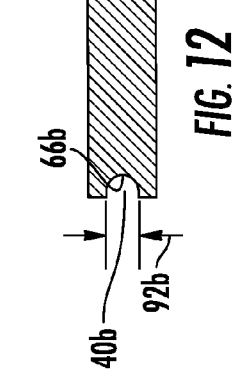
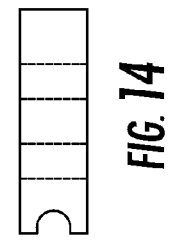

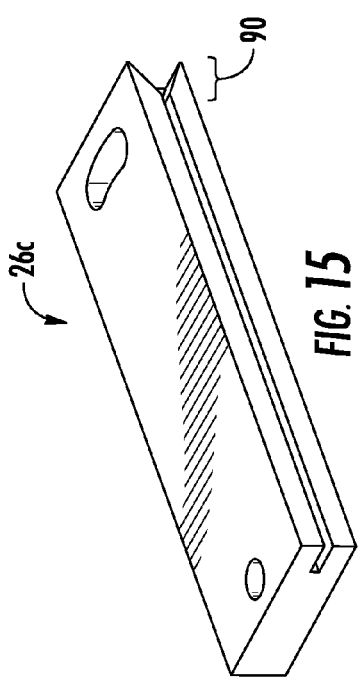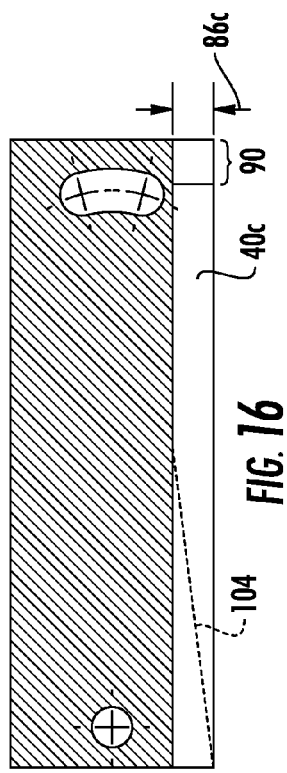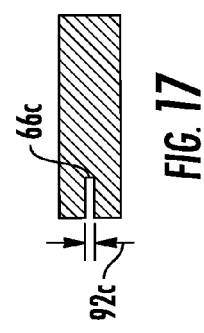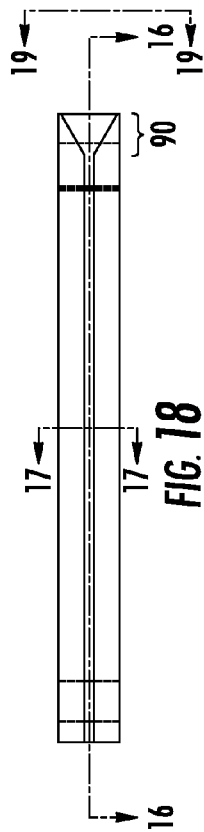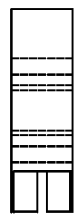

FILM EDGE SEALING DEVICE

CROSS-REFERENCE TO RELATED APPLICATIONS

The present application is a continuation patent application of U.S. patent application Ser. No. 14/827,145 filed on Aug. 14, 2015, the entire contents of which are incorporated herein by reference.

STATEMENT RE: FEDERALLY SPONSORED RESEARCH/DEVELOPMENT

Not Applicable

BACKGROUND

The various embodiments and aspects described herein relate to a machine for wrapping and sealing a product within a thermoplastic film.

A prior art film sealing device is used to wrap a product within a thermoplastic sheet, join the edges of the thermoplastic sheet as well as the leading and trailing sides to fully enclose the product in a bag. The product and the thermoplastic sheet may be passed through a heating oven in order to shrink the thermoplastic sheet to a tight fit around the product. Alternatively, it is also contemplated that product be placed in the fully enclosed bag formed by the sheet without heat shrinking. In sealing the longitudinal edge of the thermoplastic sheet, a significant amount of film is wasted since a significant portion of the longitudinal edge must be sealed due to manufacturing limitations that produce a significant amount of wasted thermoplastic sheet. The leading and trailing edges are efficiently sealed with a bar that crimps the thermoplastic sheet up the ends of the leading and trailing edges.

Accordingly, there is a need in the art for an improved method and machine for reducing the amount of waste produced when shrink-wrapping the product or just bagging the product with a plastic sheet.

BRIEF SUMMARY

The various embodiments and aspects described herein address the needs discussed above, discussed below and those that are known in the art.

An edge sealer block is provided which may be mounted to a frame of a heat sealing machine. The edge sealer block may be disposed adjacent to a conveyor of the heat sealing machine and receive side edges of a thermoplastic sheet(s). The edge sealer block has a groove with a cross-sectional configuration conducive to pushing the side edges of the thermoplastic sheet(s) together in order to melt and join the very distal edges of the thermoplastic sheet in forming the edge seal. Moreover, the edge sealer block is connected to a heating mechanism which raises the temperature of the edge sealer block in order to melt only the edges of the thermoplastic sheet(s) so that when the edges of the thermal plastic sheet(s) are placed in contact with the surfaces of the groove of the edge sealer block, the edges are joined together. In prior art fin seals, a significant amount (e.g., ½ inch) of the edge portion of the longitudinal edges of the thermoplastic sheet(s) is sealed to each other. In other prior art machines and processes, the prior art fin seal may be cut short in order to improve the aesthetics of the wrapped product. Nevertheless, a significant portion of the edge is cut off with a slitting operation. In contrast, the edge seal formed with the machine and method described herein melts and joins about a distal $1/64$" to about a distal $1/8$" edge portion of the layers of the thermoplastic sheet(s) which is significantly less than the prior art machine and methods. Preferably, the edge seal formed with the machine and method described herein melts and joins about a distal $1/32$" to about a distal $1/16$" edge portion of the layers of the thermoplastic sheet(s). Preferably, the least amount of the distal edge portion is used and may be less than a distal $1/32$" portion.

More particularly, a heat sealing machine for forming an edge seal of a folded thermoplastic sheet or two stacked layers of thermoplastic sheets when wrapping a product is disclosed. The machine may comprise a stand, a conveyor, a heater, an edge sealer block and a set of pinch rollers. The stand may hold a roll of folded thermoplastic sheet or two rolls of thermoplastic sheets. The conveyor may be placed adjacent to the stand for traversing the product towards an edge sealing assembly wherein the product is disposed between first and second layers of the folded thermoplastic sheet(s). The heater is used to generate heat. The edge sealer block may be attached to the heater so that the heater may heat the edge sealer block. The edge sealer block may be disposed adjacent to the conveyor. The edge sealer block may have a groove along a length of the edge sealer block. The base of the groove may be oriented at a skewed angle with respect to a longitudinal direction of the conveyor and the edges of the first and second layers so that the edges of the first and second layers of the thermoplastic sheet(s) approaches the base and contacts the base to melt and seal the first and second edges together to form the edge seal as the folded thermoplastic sheet(s) is fed through the edge sealing machine. The set of pinch rollers or belts may be disposed adjacent to the edge sealer block for controlling forward travel of the edges of the first and second layers of the thermoplastic sheet(s) as the edges of the first and second layers of the thermoplastic sheet(s) are fed through the groove of the edge sealer block.

The edge sealer block may reach a temperature of about 150 degrees F. to about 750 degrees F. or at least a temperature sufficient to melt and weld the edges of the sheet(s). The edge sealer block may be fabricated from a material with a high coefficient of heat transfer. An exterior surface of the groove of the edge sealer block may have an anti-friction properties or coating and/or a non-stick coating or property. A length of the base of the groove of the edge sealer block may be between about 1" and about 20". A width of the groove of the edge sealer block may be between about 0.001 inches and 2". The base of the edge sealer block may be straight or curved. The groove may define a slot angle between about 160 degrees to about zero degrees.

The set of pinch rollers or belts may comprise first and second of pinch rollers positioned upstream of the edge sealer block and one set of pinch belts laterally adjacent to the edge sealer block for controlling a position of the edges of first and second layers of the thermoplastic sheet(s).

In another aspect, an edge sealer block may be mounted to a heat sealing machine. The edge sealer block may comprise a body disposed adjacent to a conveyor. The body may have a groove along a length of the body. A base of the groove may be oriented at a skewed angle with respect to a longitudinal moving direction of the conveyor so that the edges of the first and second layers of the folded thermoplastic sheet(s) contact the base of the groove of the body as the edges of the first and second layers of the thermoplastic sheet(s) are fed through the heat sealing machine to seal the edges of the first and second layers of the thermoplastic sheet(s) together to form an edge seal.

The base of the groove of the edge sealer block having a maximum width of ⅜ inch.

The edge sealer block may be pivoted with respect to a mounting block to adjust the skew angle of the base of the groove of the body.

The base may have a rounded cross sectional configuration, a pointed cross sectional configuration, a truncated cross sectional configuration or a flat bottom configuration.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 10 is a perspective view of a second embodiment of the edge sealer block utilized in the film edge sealing device;

FIG. 11 is a top cross-sectional view of the edge sealer block shown in FIG. 10;

FIG. 12 is a cross-sectional view of the edge sealer block shown in FIG. 10;

FIG. 13 is a front view of the edge sealer block shown in FIG. 10;

FIG. 14 is a different cross-sectional view of the edge sealer block shown in FIG. 10;

FIG. 15 is a perspective view of a third embodiment of the edge sealer block utilized in the film edge sealing device;

FIG. 16 is a top cross-sectional view of the edge sealer block shown in FIG. 15;

FIG. 17 is a cross-sectional view of the edge sealer block shown in FIG. 15;

FIG. 18 is a front view of the edge sealer block shown in FIG. 15;

FIG. 19 is a different cross-sectional view of the edge sealer block shown in FIG. 15;

DETAILED DESCRIPTION

Figure 1:
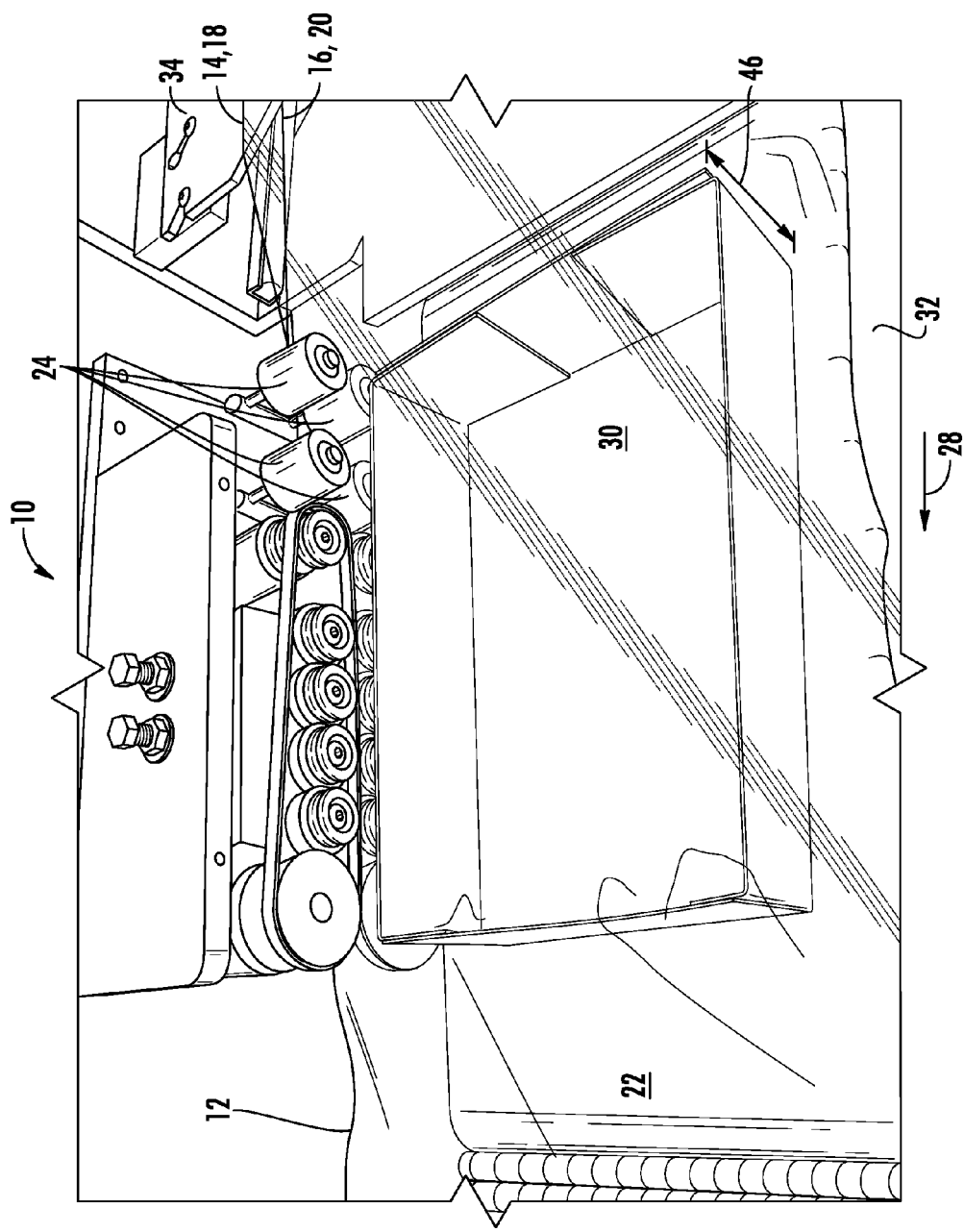
FIG. 1 is a perspective view of a heat sealing machine with a film edge sealing device.

Referring now to the drawings, a heat sealing machine 10 for forming an edge bead seal 12 that joins distal portions of the first and second edges 14, 16 of first and second layers 18, 20 of a thermoplastic sheet(s) 22 to form an edge bead seal is shown. Preferably, only a minimal distal portion of the edges are melted to form a bead and joined to each other to form the edge bead seal. By way of example and not limitation, it is a distal 1/64" to 1/8" (preferably between about a distal 1/32" to about a distal 1/16") of the longitudinal edges of the first and second layers of the thermoplastic sheet(s) that is melted to from the bead and joined to each other to form the edge bead seal. The heat sealing machine 10 has a set of rollers 24 that grip the first and second layers 18, 20 of the thermoplastic sheet(s) 22 to guide the first and second edges 14, 16 of the first and second layers 18, 20 of the thermoplastic sheet(s) 22 into the edge sealer block 26 (see FIGS. 4-28) which is heated to a melting temperature of the thermoplastic sheet(s) 22 in order to melt the first and second edges 14, 16 of the first and second layers 18, 20 of the thermoplastic sheet(s) 22 to form the bead. The first and second edges 14, 16 maintain contact with the edge sealer block 26 for a sufficient amount of time in order to melt the thermoplastic sheet(s) and form the bead. Moreover, due to a skewed angle 64 of a groove of the edge sealer block 26, a force is applied to the first and second edges 14, 16 in order to push the beads formed from the first and second edges 14, 16 together and form the edge bead seal 12 downstream of the edge sealer block 26, as shown in FIG. 1. Directional arrow 28 shows the direction of the thermoplastic sheet(s) 22 as it proceeds through the heat sealing machine 10. The edge sealer block 26 may be oriented on a lateral side as shown in FIG. 1 to the product 28 being wrapped. However, other orientations are also contemplated such as top, opposed lateral side and bottom (see FIG. 29) with respect to the product being wrapped.

The thermoplastic sheet(s) 22 used in the heat sealing machine 10. The thermal plastic sheet(s) 22 may have a thickness of about 0.0001 to about 0.03 inches. The various aspects and features described herein in relation to the heat sealing machine 10, and more particularly to the edge sealer block 26 are described in relation to the thermoplastic sheet(s) fabricated from SEALED AIR manufacturer and sold under the product name CRYOVAC. Although the thermoplastic sheet(s) 22 has been described as having a thickness of about 0.0003 inches, it is also contemplated that the thermoplastic sheet(s) 22 may be as thick as 0.03 inches or as thin as 0.0001 inches. For any particular thermoplastic sheet(s) 22, the first and second edges 14, 16 of the first and second layers 18, 20 can only be fused together to form the edge bead seal 12 with the existence of time, temperature and pressure. In the example provided herein, it is only a small distal edge portion of the edges of the first and second layers of the sheet that is melted to form a bead and joined to each other to form the edge bead seal in order to minimize thermoplastic material waste. Moreover, it is also more attractive since there is no fin that hangs out and distracts from the aesthetics of the wrapper. The edge sealer block 26 must contact the first and second edges 14, 16 for a sufficient period of time so that heat can be transferred to the first and second edges and melt the first and second edges 14, 16 to form the bead. Moreover, the edge sealer block 26 must be heated to at least a melting temperature of the thermoplastic sheet(s) 22. Preferably, the edge sealer block 26 is heated to at least 150 degrees F. which may be about 50° F. above the melting temperature of the thermoplastic sheet(s) 22. Moreover, the edge sealer block 26 may be configured (e.g., angled slot or groove) so as to apply pressure between the first and second edges 14, 16 so that the melted edges 14, 16 may be fused together when or after being cooled down. The two edges 14, 16 must be forced together to apply pressure to the edges 14, 16 and form the edge bead seal 12. No slitter is used to cut off an excess amount of edge bead seal 12.

Referring now to FIG. 1, the heat sealing machine 10 may have a conveyor 32 that transports the product 30 in the direction of directional arrow 28. A thermoplastic sheet 22 may be provided in a rolled and folded form. Alternatively, two stacked layers of thermoplastic sheets may be provided in rolled form. In this instance, both opposed distal portions of the edges of the two stacked layers of the sheets are heat sealed with two edge sealers blocks positioned on the opposed sides of the two stacked layers of sheets. The heat sealing machine 10 may have a separator 34 that separates the folded thermoplastic sheet(s) 22 to provide a gap between the first and second layers 18, 20 of the folded thermoplastic sheet(s) 22. The product 30 may be slipped between the first and second layers 18, 20. In FIG. 1, the product 30 is shown as being sandwiched between the first and second layers 18, 20 of the thermoplastic sheet(s) 22.

The heat sealing machine 10 may have a set of pinch rollers 24 that grip the first and second layers 18, 20 of the thermoplastic sheet(s) 22 and drive the first and second layers 18, 20 of the thermoplastic sheet(s) 22 at the same rate of forward travel as a conveyor 32.

Figure 2:
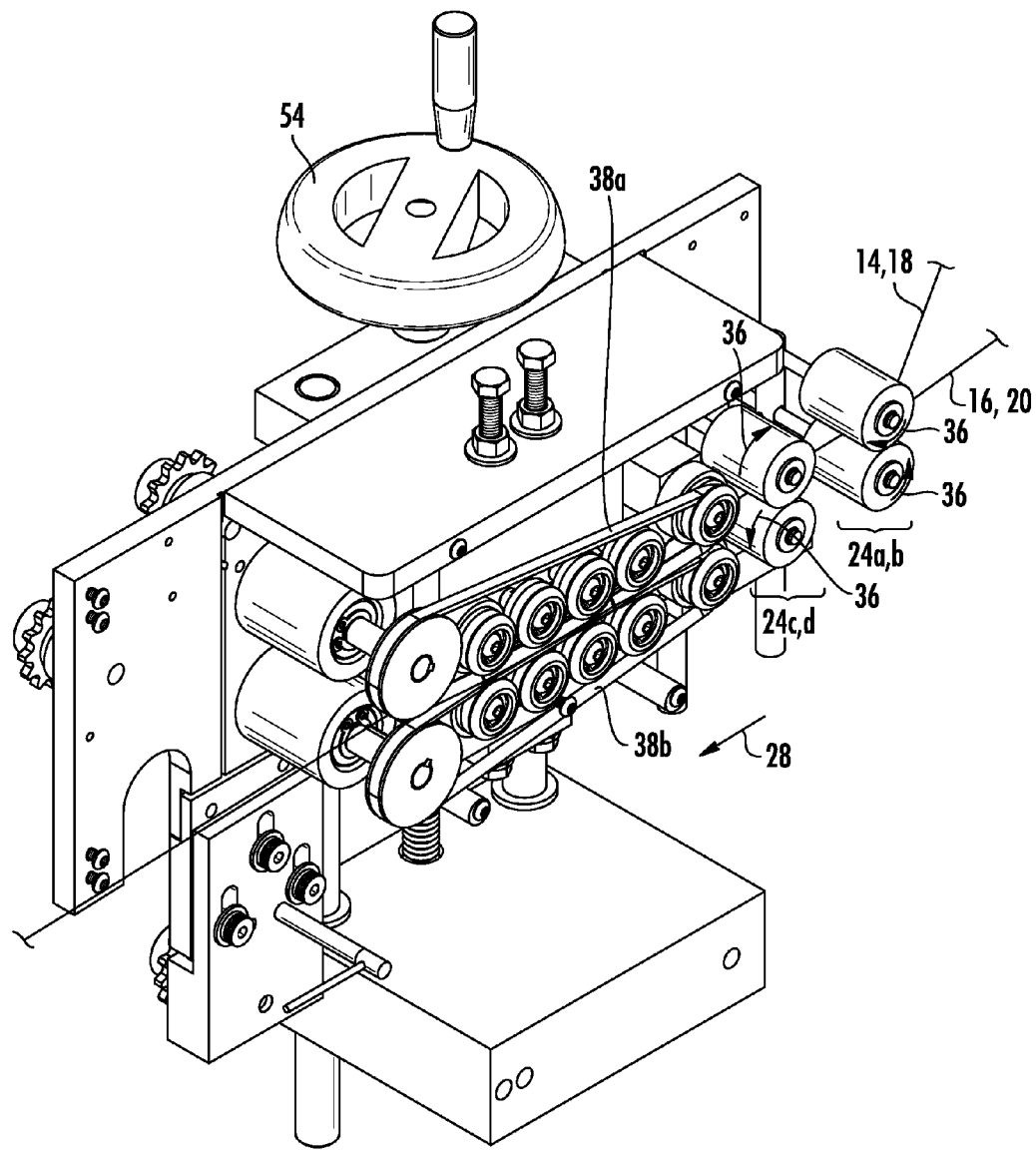
FIG. 2 is a perspective view of the film edge sealing device.

The rollers 24 include first and second sets of rollers 24*a, b* and 24*c, d*. The first and second sets of rollers 24*a, b* may rotate in the direction of arrow 36 (see FIG. 2) in order to drive the thermoplastic sheet(s) 22 in the direction of arrow 28. The rollers 24*a, b* and 24*c, d* may be fabricated from an elastomeric material in order to provide a high coefficient of friction so that the rollers 24*a, b* provide a positive grip on the first and second layers 18, 20 of thermoplastic sheet(s) 22. The first set of rollers 24*a, b* may be supplemented with a second set of rollers 24*c, d* which is identical to the first set of the rollers 24*a, b* except that it is positioned downstream from the first set of rollers 24*a, b*. The rollers 24*a-b* may be timed so that the edges 14, 16 of the first and second layers 18, 20 of the thermoplastic sheet(s) 22 travel at the same forward directional rate as the conveyor 32 of the heat sealing machine 10.

Figure 3:
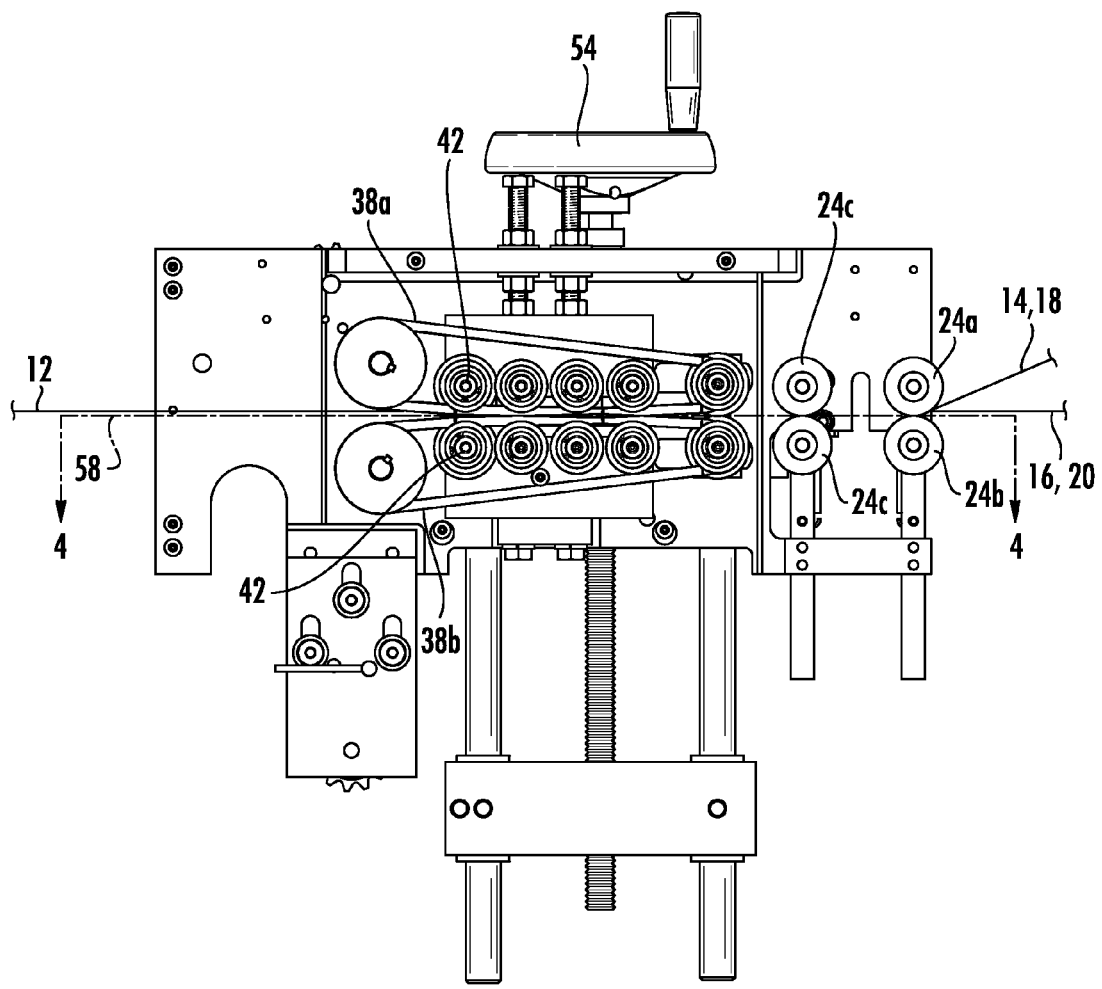
FIG. 3 is a front view of the film edge sealing device shown in FIG. 2.
Figure 4:
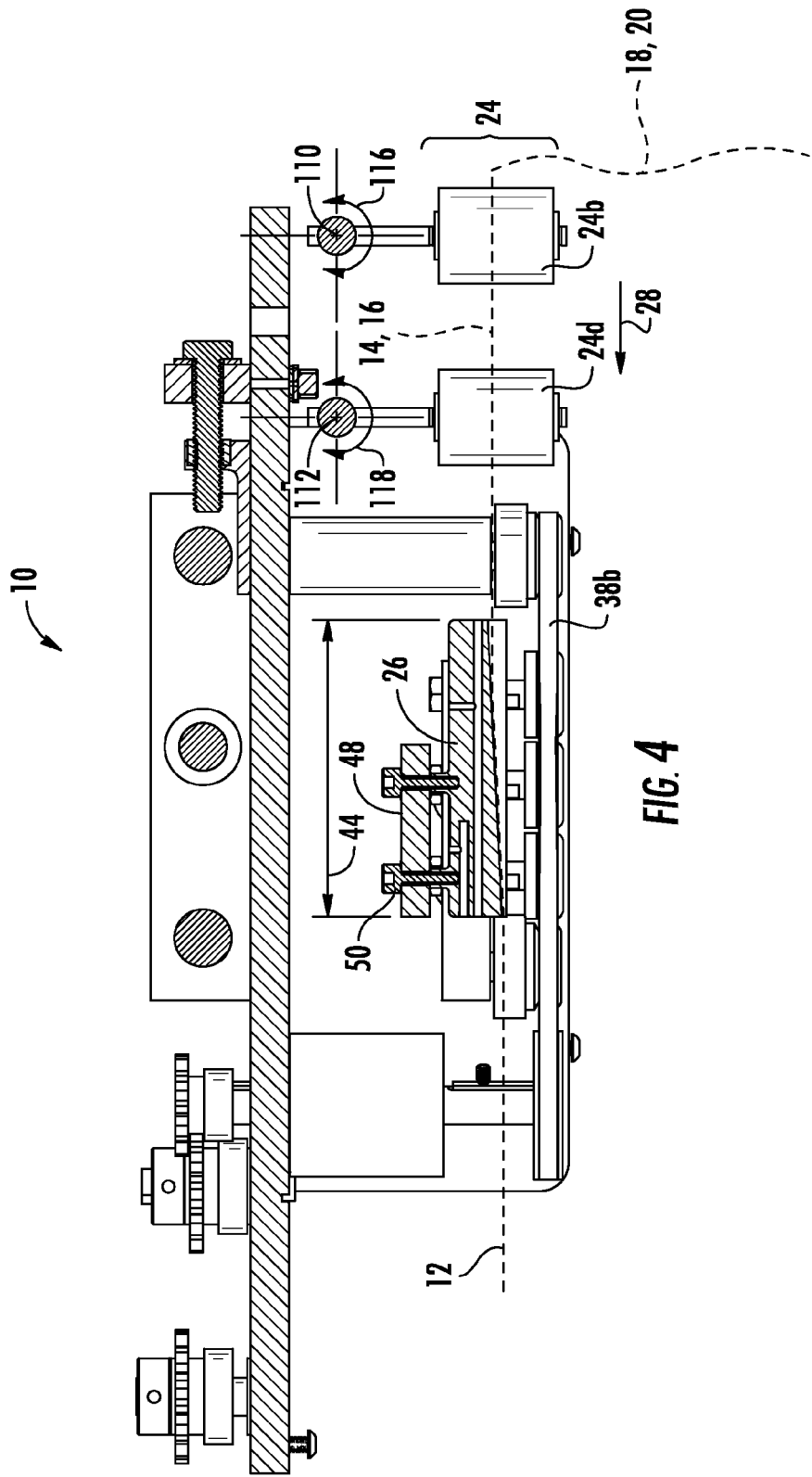
FIG. 4 is a cross-sectional top view of the film edge sealing device shown in FIG. 3.
Figure 5:
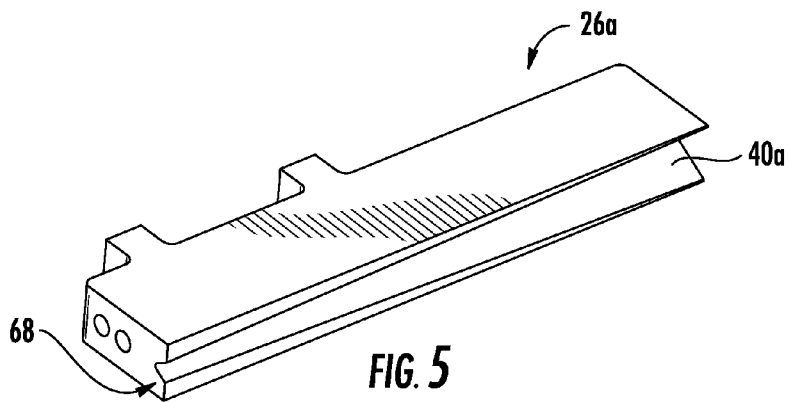
FIG. 5 is a perspective view of a first embodiment of an edge sealer block utilized in the film edge sealing device.

Downstream of the first and second sets of controllers 24*a, b*, 24*c, d*, a set of pinch belts 38*a, b* may guide the first and second layers 18, 20 of thermoplastic sheet(s) 22 across the edge sealer block 26. Referring to FIG. 4, the first and second edges 14, 16 of the first and second layers 18, 20 of the thermoplastic sheet(s) 22 may be guided to a middle portion along the axial length of the rollers 24*a, b,* and 24*c, d*. The position of the edges 14, 16 may be maintained as the first and second layers 18, 20 of the thermoplastic sheet(s) 22 are being fed into a groove of the edge sealer block 26. The pinch belts 38*a, b* do not grip the first and second edges 14, 16 but is offset inward from the edges 14, 16, as shown in FIG. 4. Preferably, the pinch belts 38*a, b* are sufficiently close to the edges 14, 16 in order to control the edges 14, 16 as the edges 14, 16 are inserted into a groove 40*a* (see FIG. 5) of the edge sealer block 26*a*. Preferably, the rigidity of the sheet(s) 22 and the distance of the pinch belt 38*a, b* from the edges 14, 16 are sufficient to control the edges 14, 16 as they pass in the groove 40*a* of the edge sealer block 26*a*. The pinch belts 38*a, b* pinch the first and second layers 18, 20 of the thermoplastic sheet(s) 22 together by a set of rollers 42 (see FIG. 3). The set of rollers 42 is preferably stacked closely adjacent to the next. The rollers 42 are disposed one after the other and preferably extends along a length 44 of the edge sealer block 26. The upper rollers 42 are vertically aligned to the lower rollers 42. The vertical elevation of the pinch belt 38*a, b* and the rollers 24*a-d* are equal to each other so that the edges 14, 16 of the first and second layers 18, 20 of the thermoplastic sheet(s) 22 run parallel with the conveyor 32. Moreover, the vertical position of the pinch belts 38*a, b* and rollers 24*a-d* may be adjusted via handle 54 in order to account for a height 46 of the product 30. Preferably, the vertical position of the rollers 24*a-d* and pinch belts 38*a, b* are disposed at a midpoint of the height 46 of the product 30.

The edge sealer block 26*a* may be attached to a frame 48 of the heat sealing machine 10 with bolts 50. The edge sealer block 26*a* may have two threaded holes 52 which engage the threads of the bolts 50. Once the edge sealer block 26*a* is attached to the frame 48, the frame and the rollers 24 and pinch belt 38 move as a unit vertically by rotating handle 54. The lateral relationship between the edge sealer block 26 and the edges 14, 16 of the first and second layers 18, 20 of the thermoplastic sheet(s) 22 may be controlled by controlling the position of the edges 14, 16. Alternatively, it is also contemplated that the frame 48, edge sealer block 26*a*, rollers 24 and pinch belts 38 may latterly move as a unit by way of a screw or other gearing mechanism. When the edge sealer block 26*a* is mounted to the frame 48, the centerline 56 (see FIG. 7) of the groove 40 of the edge sealer block 26 may be aligned to the centerline 58 (see FIG. 3) of the pinch belts 38*a, b*.

Figure 6:
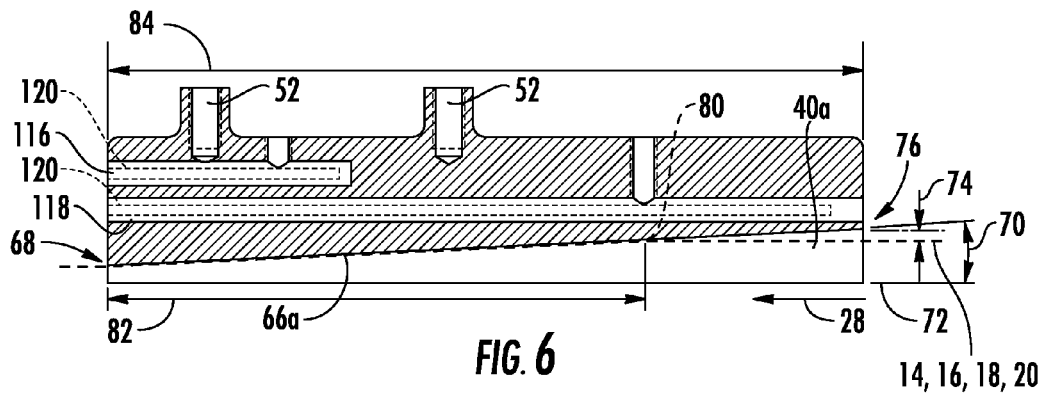
FIG. 6 is a cross-sectional top view of the edge sealer block shown in FIG. 5.

Referring now to FIG. 6, the edge sealer block 26*a* is shown as having two recesses 116, 118. Recesses 118 may receive a heater element 120. The heater element 120 is raised to an elevated temperature and transfers heat to the edge sealer block 26*a*. The other embodiments of the edge sealer block 26 may also receive the heater 120 in the same manner. Recess 116 may receive a thermocouple which may send signals to a temperature control microprocessor. The temperature control microprocessor sends electrical current to regulate the amount of heat generated by the heater thereby forming a closed loop temperature control.

Figure 7:
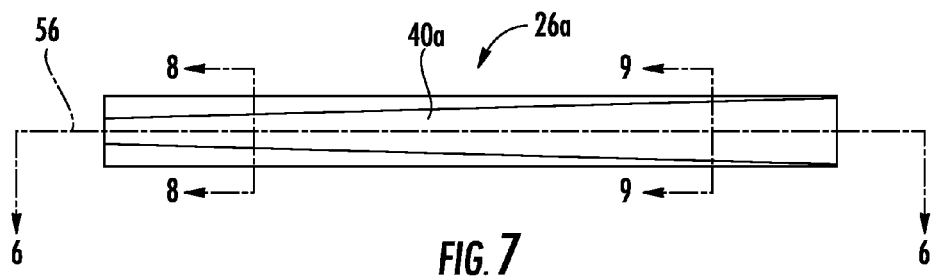
FIG. 7 is a front view of the edge sealer block shown in FIG. 5.
Figure 8:
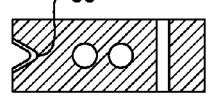
FIG. 8 is a transverse cross-sectional view of the edge sealer block shown in FIG. 7.
Figure 9:
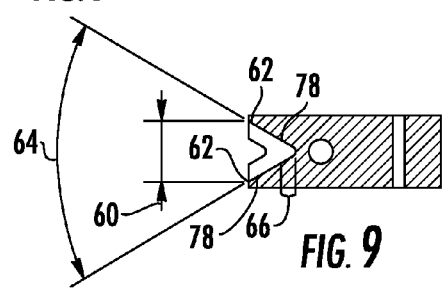
FIG. 9 is a different transverse cross-sectional view of the edge sealer block shown in FIG. 7.

Referring now to FIGS. 5-9, a first embodiment of the edge sealer block 26*a* is shown. The edge sealer block 26*a* has a groove 40*a* that runs longitudinally along the length of the edge sealer block 26*a*. The groove 40*a* is sufficiently wide 60 in that upper edges 62 of the groove 40*a* are spread apart to guide and maintain the first and second layers 18, 20 in the groove 40*a*. The groove 40*a* is an angled slot having an angle 64 of about 160 degrees to about zero degrees and is preferably about 10 degrees. The base 66 of the groove 40a may have a rounded bottom as shown in FIGS. 7 and 8. The base 66 is sufficiently narrow so that when the edges 14, 16 of the first and second layers 18, 20 of the sheet(s) 22 are urged toward the base 66, the edges 14, 16 are in physical contact with edge sealer block 26 and pushed together in order to apply pressure or force the first and second edges 14, 16 to push the edges 14, 16 in contact with each other. The edges 14, 16 begin to form beads which are fuse together when melted under heat from the edge sealer block 26a to form the edge bead seal. This minimizes waste since only the distal portion (by way of example and not limitation, distal 1/64" to 1/8" portion of the edges, and more preferably about a distal 1/32" to about a distal 1/16" portion) are melted and joined to each other to form the edge bead seal. When the edges 14, 16 exit out of the exit 68 of the edge sealer block 26a, the edges 14, 16 are fused together in the form of the edge bead seal. This improves the aesthetics of the wrapper since there is no excess sheet hanging off of the wrapper.

Referring now to FIG. 6, the base 66a of the groove 40a is shown at a skewed angle 70. The skewed angle 70 of the base 66a may be between 10 degrees to about negative 3 degrees, and more preferably between between zero and 2 degrees. The most preferred skewed angle 70 is about 1 degree. The baseline 72 refers to a direction of travel of the edges 14, 16 when the layers 18, 20 of the sheet(s) 22 are passed through the edge sealer block 26. In this regard, the direction of travel 28 is referenced as being horizontal and proceeds right to left across the page. The direction of travel 28 and the baseline 72 are parallel with each other. The direction of travel 28 and the baseline 72 may also be parallel with the edges of the upper and lower layers 18, 20 of the sheet 22. As such, the skew angle 70 may be with respect to the direction of travel 28, the baseline 72 or the edges of the layers 18, 20. The distance 74 from the edges 14, 16 of the first and second layers 18, 20 of the sheet(s) 22 to the base 66 at its entrance 76 may be about 0.375 inches to about 0.060 inches and is preferably adjusted to about 0.125 inches. The distance 74 between the entrance 76 at the base 66a of the edge sealer block 26a and the edges 14, 16 is a minimum distance in order to prevent the edges 14, 16 from rubbing against the entrance 76 of the groove 40a. It is also contemplated that the base 66 of the entrance 76 may be rounded so that if the edges 14, 16 do rub into or contact a sharp edge of the entrance 76, the entrance 76 does not tear or otherwise damage the edges 14, 16 of the first and second layers 18, 20. As the layers 18, 20 of the sheet(s) 22 pass through the groove 40a, the edges 14, 16 of the layers 18, 20 contact the sides 78 (see FIG. 9) of the groove 40a to melt the edges and form a bead. The edges 14, 16 are urged toward each other due to the angle 64 of the slot. The edges 14, 16 may contact each other at the base 66a at some point 80 after the entrance 76. The edges 14, 16 are pushed together to apply pressure to force the edges 14, 16 together. The distal portions of the edges 14, 16 are heated to melt the edges 14, 16 in order to fuse the edges 14, 16 together to form the edge bead seal. By way of example and not limitation, only the distal 1/64" to 1/8" portion (preferably distal 1/32" to 1/16" portion) of the edges are melted and joined to each other to minimize waste. Pressure and heat are applied to the first and second edges 14, 16 of the first and second layers 18, 20 of the thermoplastic sheet(s) 22 until the edges 14, 16 leave the exit 68 of the edge sealer block 26a to form the edge bead seal. Pressure is applied to the first and second edges 14, 16 by pushing the first and second layers 18, 20 into groove 40a. The edge sealer block 26a being heated melts the edges 14, 16 to form individual beads from the edges 14, 16. The beads may be formed from the distal 1/64" to distal 1/8" (preferably 1/32" to distal 1/16") of the edges 14, 16. The linear rate of speed of the sheet(s) 22 and the distance 82 between point 80 and the exit 68 define the time that pressure and heat are applied to the edges 14, 16 of the first and second layers 18, 20 of the thermoplastic sheet(s) 22. Either the linear rate of speed of the sheet(s) 22 or the distance 82 may be adjusted up or down to ensure that a sufficient amount of pressure and heat are applied to the edges 14, 16 over a period of time so that the edges 14, 16 are fused together to form the edge bead seal after the exit 68 of the edge sealer block 26a. The distance 82 is limited by a length 84 of the edge sealer block. To increase or decrease the time that pressure and heat is applied to the edges 14, 16 of the first and second layers 18, 20, the length 84 of the edge sealer block 26a may be increased or decreased. The length 82 may be between 1 inch and 20 inches and is preferably 3 inches. The length 84 may be between 1.5 inches and 22 inches and is preferably 4 inches.

Referring now to FIGS. 10-14, a second embodiment of the edge sealer block 26b is shown. The edge sealer block 26b has a groove 40b with a constant depth 86b measured from an upper edge 88b of the groove 40b to a base 66b of the groove 40b. The bottom portion of the groove 40b may be rounded as shown in FIGS. 12 and 14. The edges 14, 16 of the first and second layers 14, 16 of the thermoplastic sheet(s) 22 when pushed into the groove 40b are pushed together due to the curvature of the bottom portion of the groove 40b.

Referring now to FIGS. 15-19, a third embodiment of the edge sealer block 26c is shown. The edge sealer block 26c has a constant depth 86c and constant width 92c but additionally has a funnel shaped entrance section 90. The depth 86b, c of the grooves 40b, c may be about 0.375 inches to about 0.060 inches and is preferably about 0.25 inches. The width 92b, c of the grooves 40b, c may be about 0.25 inches to about 0.03 inches and is preferably about 0.062 inches. The base 66 may have a curved configuration as shown in FIG. 12 or a flat bottom configuration as shown in FIG. 17. With the curved configuration, the radius of the curvature may be about 0.01 inches to about 0.125 inches and is preferably about 0.06 inches.

Figure 20:
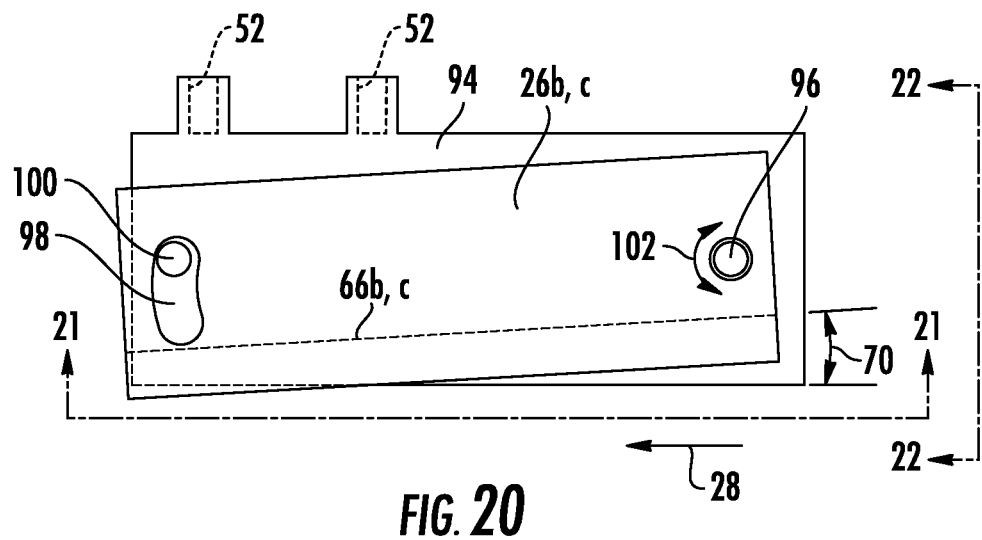
FIG. 20 is a top view of an edge sealer block pivotally mounted to a mounting block that is mounted to the frame of the heat sealing machine.
Figure 21:
FIG. 21 is a front view of the edge sealer block and the mounting block shown in FIG. 20.
Figure 22:
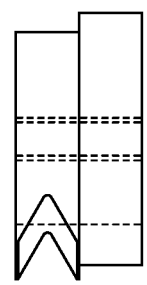
FIG. 22 is a side view of the edge sealer block and the mounting block shown in FIG. 20.
Figure 23:
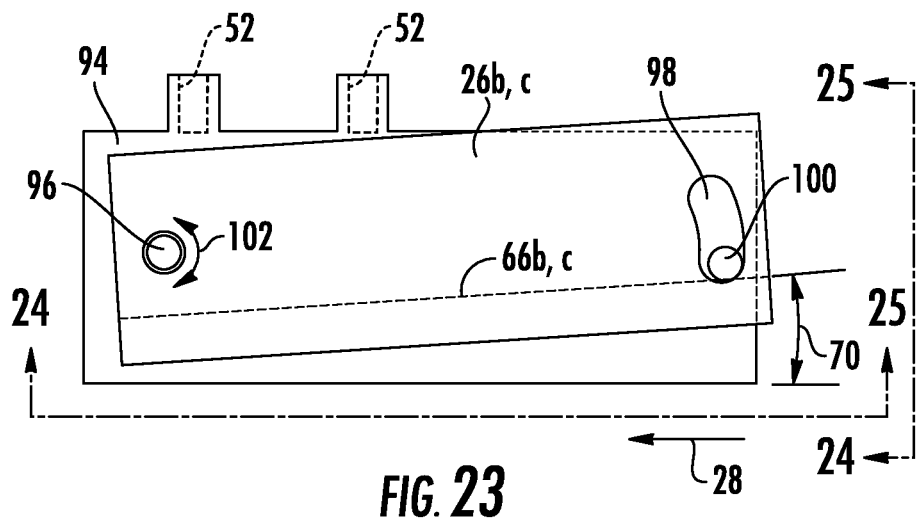
FIG. 23 is a top view of a second embodiment of an edge sealer block pivotally mounted to the mounting block that is mounted to the frame of the heat sealing machine.
Figure 24:
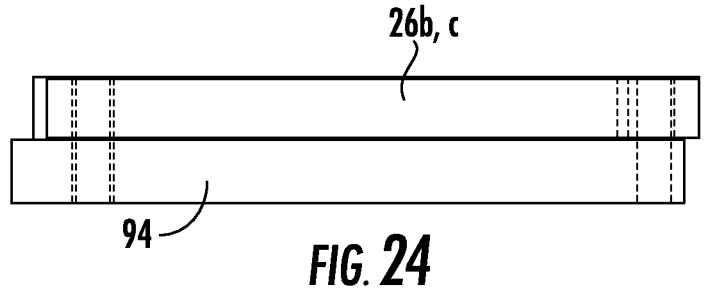
FIG. 24 is a front view of the edge sealer block and the mounting block shown in FIG. 23.
Figure 25:
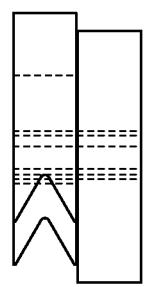
FIG. 25 is a side view of the edge sealer block and the mounting block shown in FIG. 23.

The edge sealer block 26b, c may be mounted to the frame 40a in the same manner described above in relation to edge sealer block 26a. In particular, the edge sealer block 26b, c may be pivotally mounted to a mounting block 94, as shown in FIGS. 21-25. The mounting block 94 may be secured to the frame 48 by way of bolts 50 that engage the threaded holes 52. The edge sealer blocks 26b, c may be pivotally attached to the mounting block 94 with a pin 96. On the other side of the edge sealer block 26b, c may be a curved slot 98 and a pin 100 that can limit angular rotation 102 of the edge sealer block 26b, c about pin 96. The pin 100 may also be capable of setting the angular rotation 102 of the edge sealer block 26b, c in relation to the mounting block 94. In this manner, the skewed angle 70 of the base 66b, c of the edge sealer block 26b, c may be adjusted and optimized for the thermoplastic sheet(s) 22, the speed of the thermoplastic sheet(s) 22 and other factors in forming the edge bead seal 12. The configuration shown in FIGS. 20-22 is different from the configuration shown in FIGS. 23-25 in that the angular rotation 102 is controlled at the downstream end of the edge sealer block 26b, c in FIGS. 20-22 and the upstream end of the edge sealer block 26b, c in FIGS. 23-25.

Figure 26:
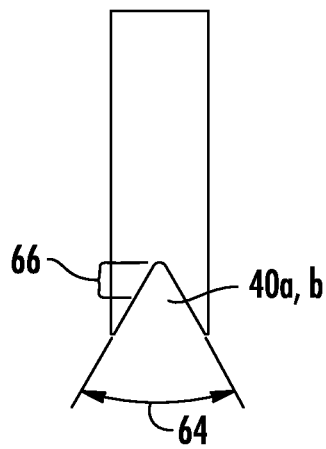
FIG. 26 illustrates a base having a round cross section along the entire length of the groove of the edge sealer block.
Figure 27:
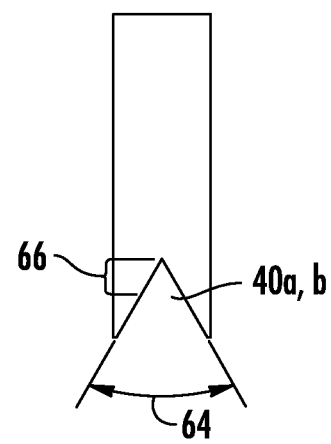
FIG. 27 illustrates a base having a pointed cross section along the entire length of the groove of the edge sealer block.
Figure 28:
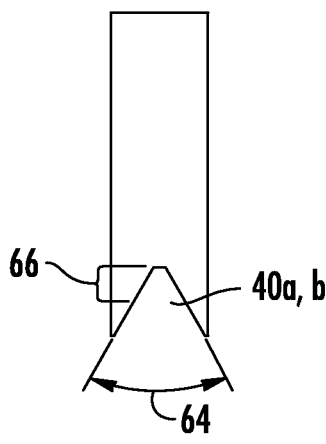
FIG. 28 illustrates a base having a truncated funnel cross section along the entire length of the groove of the edge sealer block.
Figure 29:
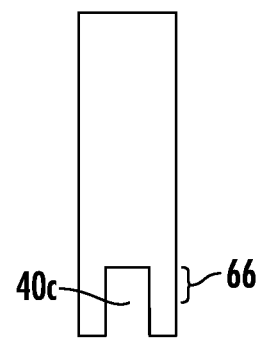
FIG. 29 illustrates a base having a flat bottom cross section along the entire length of the groove of the edge sealer block.
Figure 30:
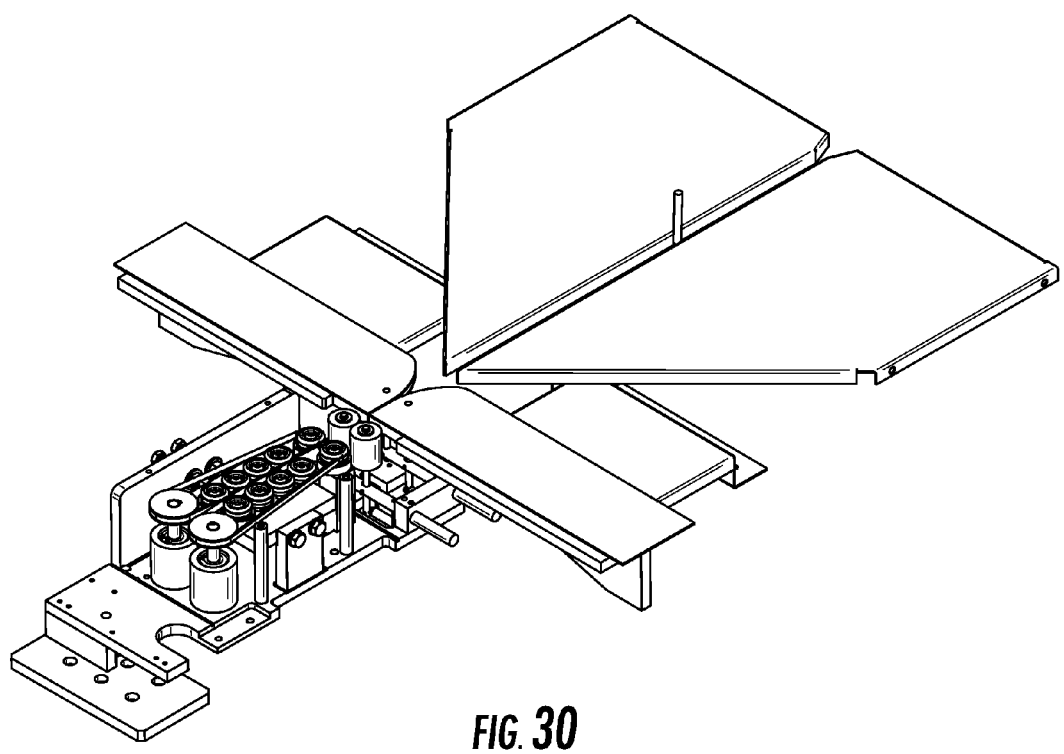
FIG. 30 illustrates the film edge sealing device mountable to a bottom side of the heat sealing machine to form a bottom edge seal.

Referring now the FIGS. 26-28, as discussed above, the groove 40a, b may have an angle 64 associated therewith. Alternatively, the groove 40c may have a constant width as shown in FIG. 29. The base 66 may have a rounded bottom as shown in FIG. 26, a pointed bottom as shown in FIG. 27 or truncated bottom as shown in FIG. 28. Additionally, the base may have a flat bottom as shown in FIG. 29. In FIGS. 15-19, the groove 40c is shown as having a funnel shaped entrance section 90. However, the funnel shaped entrance section may also be incorporated into the other embodiments of the edge sealer block 26a, b. Additionally, the groove 40c shown in FIGS. 15-19 may be straight running along the entire length of the edge sealer block 26c without the funnel shaped entrance section 90.

Referring now to FIGS. 1 and 29, the edge bead seal 12 is shown as being formed on a lateral side of the product 30 in FIGS. 1-4. However, it is also contemplated that the edge sealer block 26 may be positioned below the product 30 as shown in FIG. 29 in order to form a bottom edge seal. It is also further contemplated that the edge sealer block 26 may be positioned above the product 30 to form a top edge seal.

The edge sealer blocks 26a, b, c may be fabricated from a non-stick material or also have an anti-friction coating and/or nonstick coating. More particularly, the coating may be specifically applied to the surfaces of the groove 40a, b, c which contact the first and second layers 18, 20 and the edges 14, 16 of the thermoplastic sheet(s) 22. The coating may be selected from Teflon, polytetrafluoroethylene, ceramics, silicone, nickel, stainless steel, seasoned iron or combinations thereof. The coating on the surfaces of the groove 40a, b, c allow the thermoplastic sheet(s) 22 to slide and not buckle or twist as the edges 14, 16 of the thermoplastic sheet(s) 22 are being melted and joined to each other.

The edge sealer blocks 26a, b may also be fabricated from a material having a high coefficient of heat transfer. By way of example and not limitation, the material for the edge sealer blocks 26a, b, c may be aluminum, stainless steel, titanium, mild steel, iron, ceramic or alloys thereof.

Figure 31:
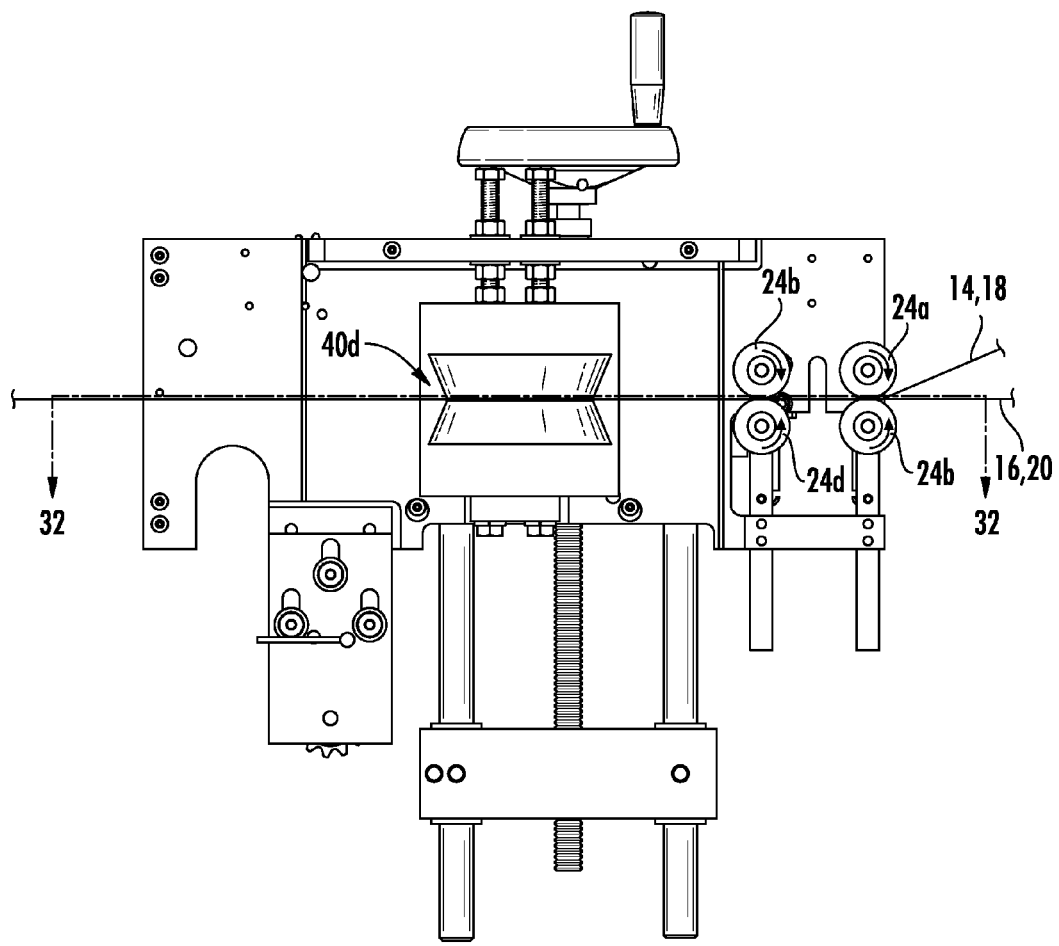
FIG. 31 illustrates a front view of a rotating edge sealer block.
Figure 32:
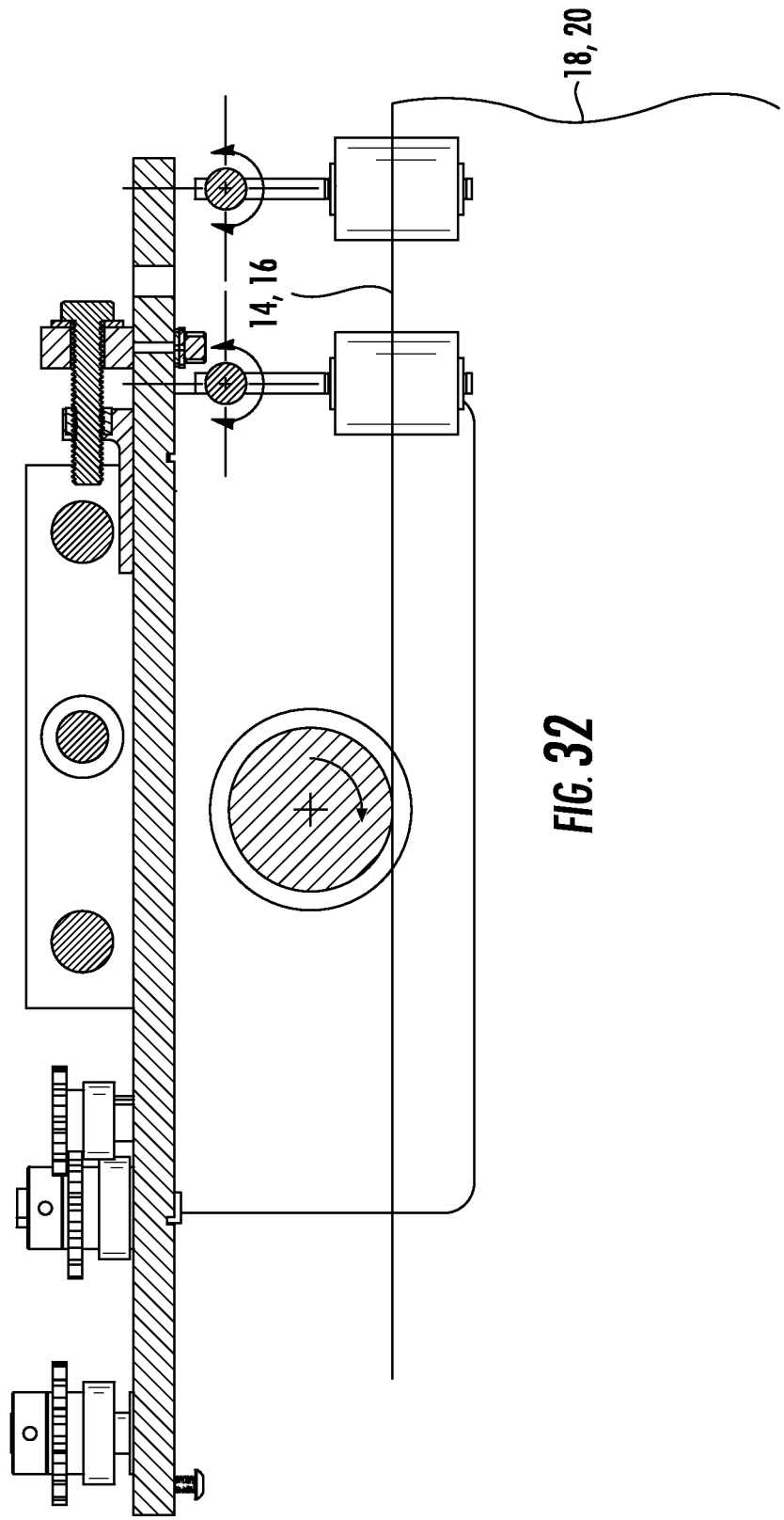
FIG. 32 illustrates a top view of the rotating edge sealer block of FIG. 31.

The edge sealer blocks 26a, b, c are all depicted as having a base 66a, b, c which is straight. However, it is also contemplated that the base 66a, b, c may have a concaved configuration including but not limited to parabolic, circular or other configurations that apply greater pressure to the edges 14, 16 of the thermoplastic sheet(s) as the first and second layers 18, 20 of the sheet(s) 22 are fed through the groove 40a, b, c. By way of example and not limitation, the dashed line 104 in FIG. 16 illustrates one particular configuration. A leading portion is straight whereas a rear portion of the base is curved. Another embodiment of the edge sealer block is shown in FIGS. 31 and 32. A rotating edge sealer block 26d replaces the stationary edge sealer blocks 26a, b, c previously discussed. The product is disposed between the upper and lower layers 18, 20 of the thermoplastic sheet(s) and the edges 14, 16 of the layers 18, 20 contact a bottom base 66d of a groove 40d. A heater may be connected to the rotating edge sealer block 26d in order to heat up the edge sealer block 26d to a temperature so as to be sufficient to heat the sheet 22 and melt the same so that the edges 14 and 16 of the layers 18, 20 of the sheet(s) can be melted and fused together when pushed toward the base 66d of the groove 40d and to each other to form the edge bead seal 12.

Referring now back to FIG. 4, the pinch rollers 24a, b and the pinch rollers 24c, d may be rotatable about a vertical axis 110, 112. Rotational arrows 116, 118 illustrate rotation of the rollers 24a, b and the rollers 24c, d. By rotating the rollers 24a, b and 24c, d, the edges 14, 16 of the first and second layers 18, 20 of the thermoplastic sheet(s) 22 may be latterly controlled in order to determine the point at which the edges 14, 16 contact the base 66 of the edge sealer block 26 as the thermoplastic sheet(s) 22 is fed through the edge sealer block 26. By rotating the rollers 24a, b and 24c, d counterclockwise, the edges 14, 16 are pushed away from the base 66 of the edge sealer block 26. Conversely, when the rollers 24a, b and 24c, d rotate in the clockwise direction, the edges 14, 16 are traversed closer to the base 66 of the edge sealer block 26.

The edges 14, 16 have been described herein as forming a bead. Each of the bead configured edges are pushed together so as to fuse the bead configured edges together to form the edge bead seal. When an edge of the thermoplastic sheet is melted, it curls up on itself, and thus forms a bead configuration. The bead configured edge is formed when the edge 14, 16 contacts the edge sealer block which is heated to at least a melting temperature of the thermoplastic sheet. The edges 14, 16 curl up and configure the edges into a bead configuration. The bead configured edges 14, 16 are then urged toward each other so that pressure is applied to force the bead configured edges 14, 16 together to form the edge bead seal 12. The edge bead seal 12 may be measured to be between about 0.001" to about 0.100" thick. More preferably, the finished seal will have a thickness between 0.004" to 0.010" thick.

The above description is given by way of example, and not limitation. Given the above disclosure, one skilled in the art could devise variations that are within the scope and spirit of the invention disclosed herein, including various ways of mounting the edge sealer block to the frame of the heat sealing machine. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A heat sealing machine for forming an edge seal of a folded thermoplastic sheet or two stacked layers of thermoplastic sheets when wrapping a product, the machine comprising:
    a stand for holding a roll of folded thermoplastic sheet or the two stacked layers of thermoplastic sheets;
    a heater mechanism;
    an edge sealer block attached to the heater mechanism for heating the edge sealer block, the edge sealer block disposed adjacent to edges of the thermoplastic sheet(s), the edge sealer block having a groove along a length of the edge sealer block, a base of the groove oriented at a skew angle with respect to the edges of first and second layers of the thermoplastic sheet(s) so that the edges of the first and second layers of the thermoplastic sheet(s) approaches the base of the groove and contacts the base to melt and seal the first and second edges together to form the edge seal as the thermoplastic sheet(s) is fed through the heat sealing machine.

2. The machine of claim 1 further comprising:
    a conveyor adjacent to the stand for traversing the product towards an edge sealing mechanism wherein the product is disposed between first and second layers of the folded thermoplastic sheet(s).

3. The machine of claim 1 wherein the skew angle of the groove base and the longitudinal direction of the conveyor is between about negative 3 degrees to about 20 degrees.

4. The machine of claim 3 wherein the skew angle is between about zero degrees to about 2 degrees to allow the edges of the first and second layers to maximize contact with the base of the groove to melt and fuse the edges of the first and second layers together.

5. The machine of claim 1 wherein the edge sealer block reaches a temperature sufficient to melt the thermoplastic sheet.

6. The machine of claim 5 wherein the temperature of the edge sealer block reaches about 100 degrees Fahrenheit to about 750 degrees Fahrenheit.

7. The machine of claim 1 wherein the base of the edge sealer block is straight or curved.

8. The machine of claim 1 wherein the groove defines a slot angle between about 160 degrees to about zero degrees.

9. The machine of claim 1 wherein the edge sealer block is fabricated from a material with a high coefficient of heat transfer.

10. The machine of claim 1 wherein an exterior surface of the groove has an anti-friction coating or properties and/or anti-stick coating or properties.

11. The machine of claim 1 wherein a length of the base of the groove of the edge sealer block is between about 1 inch and about 20 inches.

12. The machine of claim 1 wherein a width of the groove is between about 3 inches and 0.03 inches.

13. An edge sealer block mountable to a heat sealing machine, the edge sealer block comprising:
a body disposed adjacent to a thermoplastic sheet(s), the body having a base being oriented at a skew angle with respect to a longitudinal direction of the thermoplastic sheet(s) so that edges of the first and second layers of a folded thermoplastic sheet or two stacked layers of thermoplastic sheets directly contact the base of the body as the edges of the first and second layers of the thermoplastic sheet(s) are fed through the heat sealing machine and the body is adapted to be connected to a heat source to conduct heat from the heat source to the base of the body to seal the edges of the first and second layers of the thermoplastic sheet(s) together to form an edge seal;
upper and lower guides adjacent to the base of the edge sealer block to maintain the edges of the first and second layers of the thermoplastic sheet(s) on the base as the thermoplastic sheet(s) is fed through the edge sealing machine wherein the upper and lower guides and the base define a groove.

14. The edge sealer block of claim 13 further comprising a conveyor and wherein the skew angle of the base and the longitudinal direction of the conveyor is between about negative 3 degrees to about 20 degrees.

15. The edge sealer block of claim 14 wherein the skew angle is between about zero degrees to about 2 degrees to allow the edges of the first and second layers to maximize contact with the base of the groove to melt and fuse the edges of the first and second layers together.

16. The edge sealer block of claim 13 wherein the base of the groove having a maximum width of 2 inches.

17. The edge sealer block of claim 13 wherein the block is pivotable with respect to a mounting block to adjust the skew angle of the base of the groove of the body.

18. The edge sealer block of claim 13 wherein the base has a rounded cross sectional configuration, a pointed cross sectional configuration, a truncated cross sectional configuration or a flat bottom.

19. The edge sealer block of claim 13 wherein the groove and the body are circular.

20. A heat sealing machine for forming an edge seal of a folded thermoplastic sheet or two stacked layers of thermoplastic sheets when wrapping a product, the machine comprising:
a stand for holding a roll of folded thermoplastic sheet or the two stacked layers of thermoplastic sheets;
a heater mechanism;
an edge sealer block attached to the heater mechanism for heating the edge sealer block, the edge sealer block disposed adjacent to edges of the thermoplastic sheet(s), the edge sealer block having a base oriented at a skew angle with respect to the edges of first and second layers of the thermoplastic sheet(s) so that the edges of the first and second layers of the thermoplastic sheet(s) approaches the base and contacts the base to melt and seal the first and second edges together to form the edge seal as the thermoplastic sheet(s) is fed through the heat sealing machine;
upper and lower guides adjacent to the base of the edge sealer block to maintain the edges of the first and second layers of the thermoplastic sheet(s) on the base as the thermoplastic sheet(s) is fed through the heat sealing machine;
a set of pinch rollers or belts disposed adjacent to the edge sealer block for controlling forward travel of the edges of the first and second layers of the thermoplastic sheet(s) as the edges of the first and second layers of the thermoplastic sheet(s) are fed against the base of the edge sealer block.

21. The machine of claim 20 wherein the upper and lower guides are integral with the edge sealer block, and the upper and lower guides and the base define a groove through which the thermoplastic sheet(s) are fed to seal the first and second edges of the thermoplastic sheet(s).

22. The machine of claim 20 wherein the set of pinch rollers or belts comprise first and second of pinch rollers positioned upstream of the edge sealer block and one set of pinch belts laterally adjacent to the edge sealer block.

* * * * *